Jan. 6, 1970     E. M. BOGAR, JR     3,487,947
FISHING ROD HOLDER
Filed Nov. 29, 1967
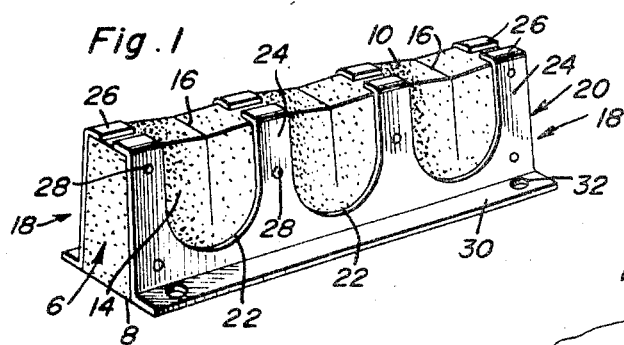
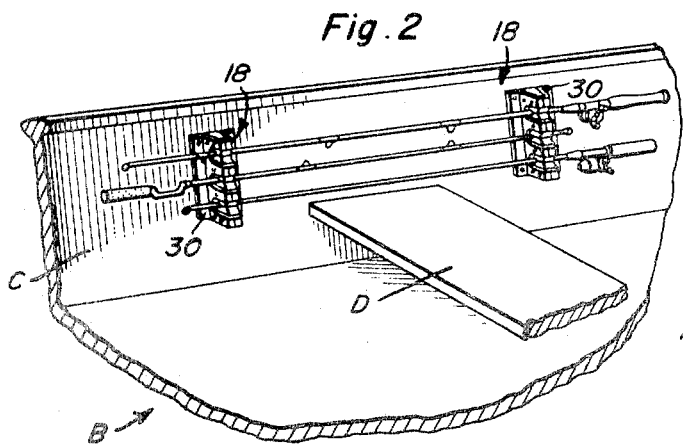
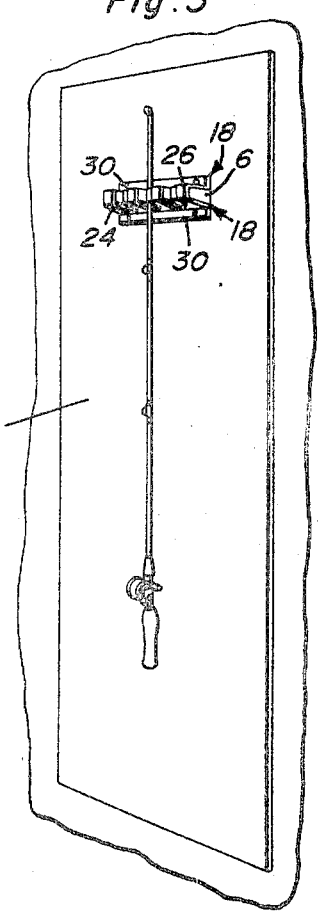
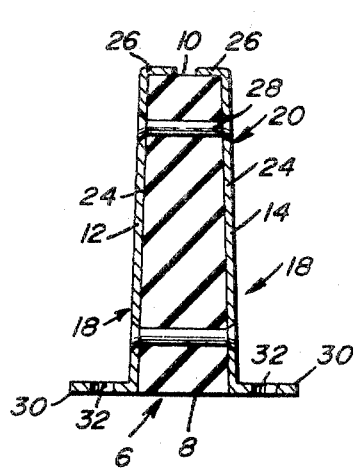
Earl M. Bogar, Jr.
INVENTOR.
BY *Clarence A. O'Brien*
*and Harvey B. Jacobson*
Attorneys

United States Patent Office 3,487,947
Patented Jan. 6, 1970

3,487,947
FISHING ROD HOLDER
Earl M. Bogar, Jr., Box 4152,
Houston, Tex. 77014
Filed Nov. 29, 1967, Ser. No. 686,626
Int. Cl. A47f 7/00, 5/08
U.S. Cl. 211—60                                  8 Claims

ABSTRACT OF THE DISCLOSURE

A fishing rod holder for retention and storage of rods. It can be mounted on a wall, a vertical door, overhead in a cabin boat, atop fishing boat seats, mounted singly or in pairs on the interior of the boat's gunnel or where needed for accessible use. It comprises a rectangular neoprene block having keeper slots for protective reception and yieldably grippable retention of rods. This block is sandwiched between a pair of L-shaped aluminum brackets which provide a stabilizing and shape-sustaining sheath. The rods simply snap in and out of the slots or kerfs.

---

This invention relates to a new and improved assembling storing and holding device for a plurality of fishing rods and which is susceptible of compact and convenient use as above suggested, herein shown, and hereinafter more fully described.

The holder herein comprehended is simple, practical and economical, and well serves the special purposes for which it has been perfected and successfully used. One holder functions for virtually any and all rods customarily used by anglers. These rods are attached and detached readily and easily and once in place, they stay put but are available when needed. The anodized aluminum sheath in which the rubber block is lodged and riveted will not tarnish, rust or corrode. The keeper slots in the neoprene block will not damage the user's rods. Screws can be reliably used when mounting the holder in boats. Alternatively, the holder lends itself to attachment with use of an epoxy; or, it can be fiber-glassed in place.

Briefly, the rod holder is characterized by coacting component parts, namely, a rectangular block of synthetic rubber and a pair of units which are herein designated as brackets. The block is made of neoprene or equivalent rubber and has one or more slits. These slits open through the sides of the block and one lengthwise edge and provide seating and yieldable rod holding kerfs. The brackets are L-shaped and are comparable with elongated right-angular clips. The block is riveted and clenched firmly between the main flanges. These flanges have openings which partially expose the block surfaces and afford access to the kerfs. The narrower flanges are used for screwing or otherwise securing the over-all device on the support surface desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a fishing rod holder constructed in accordance with the invention.

FIG. 2 is a view in perspective showing a fragmentary portion of a boat with a seat and a part of the boat's gunnel and wherein a pair of fishing rod holders are shown mounted vertically on the interior in a manner to accommodate a plurality of horizontally disposed accessible fishing rods.

FIG. 3 is a fragmentary perspective view showing a single horizontally disposed rod holder with a single rod and with the holders mounted on a vertical support member which can represent a door, wall or any equivalent support surface.

FIG. 4 is an enlarged cross-sectional view taken through the holder as illustrated in FIG. 1.

By way of introduction to the description of the details the holder shown for example in FIG. 1 can be used singly as illustrated in FIG. 3, can be employed in a vertical or horizontal position, can be used in pairs shown in FIG. 2 and employed for storing rods for display on a vertical wall in a store, for mounting six or more or less rods with said two rods in each kerf or slot on whatever surface desired. Then, too, the device has been and can be successfully used overhead in cabin boats and mounted in pairs atop seats where it has been found ideal for use in whaler rigs.

The neoprene rubber or equivalent compressibly resilient block, may be said to be the essence or core of the invention and it is denoted, generally stated, by the numeral 6. It has a longitudinal flat bottom marginal edge 8, a top marginal edge 10 and side faces or surfaces 12 and 14 (FIG. 4). This block is preferably, but not necessarily, rectangular in form. This block is provided with vertical longitudinally spaced slits (FIG. 1) and each slit is normally contracted but provides a spreadable and closable rod seating and retaining kerf. Each kerf is denoted in FIG. 1, for example, by the numeral 16. Each kerf opens through the upper marginal edge 10 and through the main side surfaces 12 and 14. This slitted rubber or equivalent block is lodged and compressed and held between duplicate component parts which conjointly provide a simple block mounting sheath. Each component part is defined, more specifically stated, as an L-shaped unit or bracket. Two such brackets are provided and they are preferably made of anodized aluminum and, as experience has shown, will not rust, tarnish or corrode. A description of one bracket will suffice. Each bracket is denoted, as an entity, by the numeral 18. The bracket can be said to be substantially L-shaped in end view. In fact, it compares with a simple elongated L-shaped clip. The main vertical flange (FIG. 1) is denoted at 20 and this flange is provided with a plurality of U-shaped or equivalent cutouts or openings 22. These cutouts transform the flange into a plurality of spaced coplanar fingers 24. The upper free ends of the fingers are bent laterally as at 26 and provide hooks and are hooked over the slitted upper marginal edge 10 in the manner shown. These hooked fingers are riveted in place as denoted at 28. More explicitly the thus constructed flange 20 contacts the cooperating surface of the rubber block. The hooked fingers, riveted in place, and the cutouts 22 provide clearance for the rods and expose the kerfs or slots for ready use. The relatively narrow flange 30 provides an attaching or mounting flange and is preferably provided with holes at 32 to accommodate attaching and retaining screws in the manner suggested in FIGS. 2 and 3. The flanges 30 are in a common plane with each other and also coplanar with the marginal edge 8 of the clenched block.

The over-all ready-to-use fishing rod holder is adequately illustrated, it is believed in FIG. 1 and the details are brought out in FIGS. 1 and 4, respectively. The horizontal single use on a wall is shown satisfactorily in FIG. 3 to illustrate one manner of use. The manner in which the holders are used in vertical spaced apart pairs on a boat is shown in FIG. 2. The panel or wall for vertical mounting is denoted at A in FIG. 3. The boat is denoted at B in FIG. 2 and the gunnel or side wall at C. The boat seat is denoted at D. It is within the purview of the invention to mount the holders on adjacent seats, one of which is shown in FIG. 2. It is submitted that the construction and manner of use of the invention should be clear from the specification and illustrative views of the drawing. A more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fishing rod holder comprising: a pair of spaced parallel opposed brackets having outstanding coplanar mounting and attaching flanges adapted to be superimposed upon and secured to a support surface and a filler interposed and fastened between component portions of said brackets and having selectively usable normally contracted rod receiving sung-fitting and retaining kerfs, said kerfs being unobstructedly open at their outer ends to facilitate the steps of inserting and removing said rods at will, said brackets being elongated, said flanges being correspondingly elongated and flat-faced, said filler comprising a block of rubber which is likewise correspondingly elongated, said block having a longitudinal upper edge and having vertical slits closed at lower ends, opening through the upper lengthwise edge and defining said kerfs, said kerfs being spaced apart and interrelated to permit the fishing rods to be lodged and grippingly but removably held without colliding with each other.

2. The rod holder defined in and according to claim 1, and wherein said brackets are made of aluminum and said filler is made of neoprene rubber.

3. The rod holder defined in and according to claim 2, and wherein each bracket is substantially L-shaped in end view and embodies means including lateral members which are hooked over a coacting marginal edge of said block.

4. A holder for a plurality of fishing rods comprising a compressibly resilient block of rubber having top and bottom edges and, the body portion of said block having slits opening through the side faces and the upper longitudinal edge and providing rod seating and retaining kerfs, and a block encompassing and shape-sustaining sheath substantially enclosing said block, said sheath comprising a pair of like brackets each bracket being L-shaped in end elevation and embodying a mounting and attaching flange and a block contacting flange said attaching flanges projecting at right angles from the adjacent faces of said block in a common plane said block confronting and contacting flanges being disposed in spaced apart parallel relationship and said block being sandwiched and fastened between said contacting flanges.

5. The holder defined in and according to claim 4, and wherein each contacting flange is provided with longitudinally spaced rod clearing U-shaped openings, and said openings being in line with and exposing said kerfs to view and for unobstructed usability.

6. The holder defined in and according to claim 5, and wherein said U-shaped openings are relatively broad and the coacting portions of each contacting flange embodies relatively narrow fingers, said fingers having free ends which are bent laterally and provide terminal hooks, and said hooks being clenched over cooperating portions of the upper longitudinal edge of said block.

7. A fishing rod holder comprising substantially rigid sheet material sheath means having self-contained surface abutting means capable of being superimposed upon and retentively secured to relatively stationary support means, filler means lodged within the confines of the sheath means, said filler means being compressibly resilient and embodying broad side surfaces and encompassing marginal edges, said filler means embodying an elongate kerf opening through coacting side surfaces and at least one marginal edge and providing rod inserting and gripping means, the confronting surfaces of said last-named means being resilient and normally in direct face-to-face rod accommodating but yieldably spreadable contact and serving to yieldingly grip and hold a portion of a fishing rod between themselves, said sheath means embodying shape sustaining flanges contacting and binding portions of the filler means, certain of said flanges being in a common plane and having marginal edges spaced from each other and also the intervening rod inserting and gripping means and providing unobstructed clearance openings for said fishing rod.

8. The fishing rod holder defined in and according to claim 7, and wherein said certain flanges are relatively narrow and are firmly bound against coordinating surfaces of the filler means in a manner to clench and lodge the filler means in its given position.

References Cited

UNITED STATES PATENTS

| | | | |
|---|---|---|---|
| 2,591,805 | 4/1952 | Gossett | 211—60 |
| 2,929,539 | 3/1960 | Safreno | 211—64 |
| 3,291,427 | 12/1966 | Hutchings | 211—60 |

JAMES A. LEPPINK, Primary Examiner

U.S. Cl. X.R.

211—89